(12) United States Patent
Mayer et al.

(10) Patent No.: US 11,231,058 B2
(45) Date of Patent: Jan. 25, 2022

(54) BONDING OBJECTS TOGETHER (71) Applicant: Woodwelding AG, Stansstad (CH)

(72) Inventors: Jörg Mayer, Niederlenz (CH); Patricia Poschner, Meikirch (CH); Joakim Kvist, Grenchen (CH); Jonas Germann, Gümligen (CH)

(73) Assignee: WOODWELDING AG, Stansstad (CH)

( * ) Notice: Subject to any disclaimer, the term of this patent is extended or adjusted under 35 U.S.C. 154(b) by 697 days.

(21) Appl. No.: 15/565,535

(22) PCT Filed: Apr. 18, 2016

(86) PCT No.: PCT/CH2016/000067
§ 371 (c)(1),
(2) Date: Oct. 10, 2017

(87) PCT Pub. No.: WO2016/165036
PCT Pub. Date: Oct. 20, 2016

(65) Prior Publication Data
US 2018/0094661 A1 Apr. 5, 2018

(30) Foreign Application Priority Data
Apr. 16, 2015 (CH) .................... 00533/15

(51) Int. Cl.
*B29C 65/08* (2006.01)
*B29C 65/00* (2006.01)
(Continued)

(52) U.S. Cl.
CPC ............... *F16B 5/04* (2013.01); *B29C 65/08* (2013.01); *B29C 66/7392* (2013.01);
(Continued)

(58) Field of Classification Search
CPC .......... F16B 5/04; F16B 11/006; B29C 65/08; B29C 66/7392; B29C 65/48;
(Continued)

(56) References Cited

U.S. PATENT DOCUMENTS 3,920,268 A * 11/1975 Stewing ................. B29C 65/42
 285/21.1
4,190,945 A * 3/1980 Yoshida ................. A44B 19/58
 29/408

(Continued)

FOREIGN PATENT DOCUMENTS

DE 10 2011 122 449 6/2013
DE 20 2014 003 925 7/2014
(Continued)

OTHER PUBLICATIONS

International Preliminary Report on Patentability dated Oct. 17, 2017 (dated Oct. 17, 2017), Application No. PCT/CH2016/000067, 7 pages.
(Continued)

*Primary Examiner* — Jacob T Minskey
*Assistant Examiner* — Caroline Beha
(74) *Attorney, Agent, or Firm* — Rankin, Hill & Clark LLP (57) ABSTRACT

A method of mechanically connecting a connector to a first object includes providing the first object having an opening, providing a first connector element, a second connector element, and thermoplastic material in a solid state, placing the first and second connector elements relative to the opening, causing energy to impinge on the thermoplastic material until at least a portion thereof becomes flowable and flows relative to the first and second connector elements until it is in direct (intimate) contact with both the first and second connector elements, and causing the thermoplastic
(Continued)

material to re-solidify (for example by letting the thermoplastic material to cool down to room temperature). The re-solidified thermoplastic material locks the first and second connector elements relative to one another to yield a connector assembly that is anchored in the opening by the thermoplastic material and/or by the locking of the first and second connector elements.

25 Claims, 6 Drawing Sheets (51) Int. Cl.
| | | |
|---|---|---|
| *B29C 65/48* | (2006.01) | |
| *B29C 65/56* | (2006.01) | |
| *F16B 5/04* | (2006.01) | |
| *F16B 11/00* | (2006.01) | |

(52) U.S. Cl.
CPC ............ *B29C 65/48* (2013.01); *B29C 65/562* (2013.01); *B29C 66/1122* (2013.01); *B29C 66/41* (2013.01); *B29C 66/474* (2013.01); *B29C 66/721* (2013.01); *B29C 66/727* (2013.01); *B29C 66/742* (2013.01); *B29C 66/8322* (2013.01); *F16B 11/006* (2013.01)

(58) Field of Classification Search
CPC ... B29C 65/562; B29C 66/1122; B29C 66/41; B29C 66/474; B29C 66/721; B29C 66/727; B29C 66/742; B29C 66/8322; B29C 65/56; B29C 65/565; B29C 65/60; B29C 66/303; B29C 66/3032; B29C 66/30321; B29C 66/30325; B29C 66/5221; B29C 66/5241; B29C 66/5326
USPC ........ 156/91, 73.1, 92, 73.5, 293, 294, 73.6, 156/308.2, 309.6
See application file for complete search history.

(56) References Cited

U.S. PATENT DOCUMENTS

| | | | | |
|---|---|---|---|---|
| 4,817,264 | A * | 4/1989 | Worthing | B29C 66/112 |
| | | | | 29/512 |
| 5,093,957 | A * | 3/1992 | Do | E04C 2/365 |
| | | | | 16/2.1 |
| 6,131,954 | A * | 10/2000 | Campbell | B29C 65/342 |
| | | | | 285/21.1 |
| 8,528,299 | B2 * | 9/2013 | Cove | B29C 65/08 |
| | | | | 52/745.21 |
| 2006/0196990 | A1* | 9/2006 | Wallace | B29C 65/54 |
| | | | | 242/609.4 |
| 2009/0022924 | A1* | 1/2009 | Griffin | E04D 5/12 |
| | | | | 428/40.2 |
| 2010/0175811 | A1* | 7/2010 | Kumai | B29C 65/44 |
| | | | | 156/91 |

FOREIGN PATENT DOCUMENTS

| | | | | |
|---|---|---|---|---|
| EP | 2 781 762 | | 9/2014 | |
| WO | 2008/034276 | | 3/2008 | |
| WO | 2010/040499 | | 4/2010 | |
| WO | 2010/072009 | | 7/2010 | |
| WO | WO-2010072009 | A1 * | 7/2010 | ............ B29C 65/08 |
| WO | 2011/029208 | | 3/2011 | |

OTHER PUBLICATIONS

Indian Office Action dated Oct. 28, 2020, Application No. 201717031896, 6 pages.

* cited by examiner

BONDING OBJECTS TOGETHER

BACKGROUND OF THE INVENTION

Field of the Invention

The invention is in the fields of mechanical engineering and construction, especially mechanical construction, for example automotive engineering, aircraft construction, shipbuilding, machine construction, toy construction etc.

Description of Related Art

In the automotive, aviation and other industries, there has been a tendency to move away from steel constructions and to use lightweight material such as aluminium or magnesium metal sheets or die-cast parts, or carbon fiber reinforced polymers instead.

The new materials cause new challenges in bonding elements of these materials—especially of bonding flattish objects (such as panels or boards) together or bonding a flattish object to an other object.

Difficulties especially arise if objects of different materials are to be connected, such as two materials of the group including steel, aluminium magnesium alloys, or fiber reinforced polymers—together. Conventional rivet connections with metallic rivets firstly suffer from the drawback that the electrochemical potential of some of these materials is strongly different with differences corresponding to several volts, so that there will be substantial galvanic corrosion. Also, connections involving flat objects of fiber reinforced polymers suffer from the additional drawback that the out-of-plane Young's modulus of these materials is very low, and the friction force arising from the compression of the objects between the rivet head and rivet foot does not substantially contribute to the mechanical stability of the connection. (In this text, generally the broadening at the end from which the rivet is accessed for a deformation process is called "head", whereas the broadening at the other, distal end is called "foot". In literature, often both ends of the rivet are called 'heads', In addition, metallic rivets feature the problem that the need to be over-pressed to compensate the elastic "springback" deformation that occurs after the deforming force is turned off.

It has been proposed to use a lacquer on metallic rivet to electrically insulate the connector. However, lacquer may become brittle over time, especially when subject to long-time mechanical wear due to vibration, or it can dissolve.

For connections between thermoplastic objects, it has further been proposed to shape a rivet shaft as part of one of the objects to be joined and to form a rivet head after positioning relative to the other object by ultrasonic deformation. However, this kind of connection is restricted to bonding thermoplastic materials and not suited for solving the above-mentioned problems.

To solve these problems, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond.

SUMMARY OF THE INVENTION

It is an object of the present invention to provide a method of mechanically connecting a connector to a first object, the method overcoming drawbacks of prior art methods. It is a further object to provide equipment for carrying out the method.

According to an aspect of the invention, a method of mechanically connecting a connector to a first object includes:
  providing the first object, the object having an opening,
  providing a first connector element, a second connector element, and thermoplastic material in a solid state,
  placing the first and second connector elements relative to the opening,
  causing energy to impinge on the thermoplastic material, until at least a flow portion thereof becomes flowable and flows relative to the first and second connector elements until it is in direct (intimate) contact with both, the first connector element and the second connector element,
  causing the thermoplastic material to re-solidify (for example by letting the thermoplastic material to cool down to room temperature),
  whereby the re-solidified thermoplastic material locks the first and second connector elements relative to one another to yield a connector assembly including the first connector element, the second connector element and the thermoplastic material, and
  whereby the connector assembly is anchored in the opening by the thermoplastic material or by the locking of the first and second connector elements or both.

This approach according to the invention may be based on the concept that the joining of the first and second connecting elements in situ (after being placed relative to the opening) may add functionality compared to a pre-manufactured connector, such as a rivet. This may be used for:
  strength (for example, after the process the resulting connector may include both, a pre-manufactured head portion and a pre-manufactured foot portion, as explained in more detail further below). Such pre-manufactured head or foot portions may be of a strength large enough that they cannot be deformed by forces that are such as to not anyway destroy the whole objects. If coupling structures (such as a thread for connecting a further element) are arranged suitably, the anchoring of the connector can, for example, withstand pulling or other forces of almost arbitrary magnitudes;
  joining different materials, including materials the pairing of which under normal circumstances leads to substantial corrosion;
  add further functionality, such as damping or isolating, or stabilizing against torques;
  Thermal expansion adaptation through material flow: It may be that the assembly that includes the first object and the connector (and possibly any further, second object (see below)) is subsequently to using the method described herein subject to a process that comes with temperature changes—for example an electrodeposition process taking place in a bath at elevated temperature. Similarly, during use of the assembly there may be temperature variations also. In such situations, due to different coefficients of thermal expansion substantial forces/deformation may arise. Due to the capability of thermoplastic material to deform, especially if it is above its glass transition temperature, such different thermal expansions may be compensated for by deformation of the material. Thus, in embodiments, the thermoplastic material is chosen so that it has a glass transition temperature below the temperature in such a process (for example 180° C. for cathodic electrodeposition often used in industrial manufacturing processes) but a liquefaction temperature above this process temperature.

To this end, one or a combination of the following conceptual ideas may be realized.

The first and second connector elements are joined in a manner that different shapes and/or dimensions are adapted. For example, the first connector element may include an inner section, and the second connector element may include an outer section (especially as a tube portion) encompassing, in at least one axial depth within the opening, the inner section, wherein the cross sectional shapes of the inner and the outer section are different. The thermoplastic material may fill the space between the inner and outer sections and thereby lock the sections to each other and compensate for the different shapes/dimensions. In an example, one of the inner section and the outer section may have an essentially circular cross section, whereas the other one has a polygonal cross section. Due to this approach, also manufacturing tolerances may be compensated for.

Similarly, the approach may also compensate for different shapes and/or dimensions and/or manufacturing tolerances between the opening and the connector element. More in general, the first and second connector elements overlap each other in at least one axial depth in the opening, with a space between them, which space (that is in the interior of the opening) is filled by the thermoplastic material to lock the overlapping parts (sections) of the connector element with respect to each other. The depth of the overlap is substantial, especially at least 30% or at least 50% or 70% of the axial extension of the opening; it may essentially correspond to the full axial extension of the opening.

The thermoplastic material may be an electrical and/or thermal insulator and be arranged for isolating the connector elements from each other (for example in that the thermoplastic material prevents any direct contact between them).

Similarly, in addition or as an alternative, the thermoplastic material may be arranged for isolating the connector elements from the object or objects they are anchored in. In this, to this end, the process may be carried out in a manner that thermoplastic material of the connector is not only liquefied to lock the connector elements with respect to each other, but also to coat the circumferential wall(s), to get into intimate contact with it/them and to fill possible irregularities/structures of the first and/or second objects or gaps between the first and second object. In this way, a seal protecting the connection against corrosion or other influences is formed. While for some applications it is not necessary that all regions of the wall are coated in this step, in order for this seal to fulfill its function, it is often necessary that the circumferential wall is coated at least along a full circumference.

In embodiments, in the step of causing energy to impinge on the thermoplastic material until at least a flow portion thereof becomes flowable, the step may include causing the flow portion to flow into the structures of the first connector element and of the second connector element, whereby the re-solidified thermoplastic material locks the first and second connector elements relative to one another in a positive-fit manner.

The structures may be such that the positive-fit is a positive-fit with respect to axial movements (movements parallel to the axis of the opening).

Such structures are macroscopic structures (different from a microscopic structure of a smooth surface). They may include at least one indentation or protrusion, such as at least one groove or ridge, especially a plurality of, for example, circumferential grooves and/or ridges or grooves and/or ridges running in inclined directions. Other patterns of grooves/ridges, dips or humps, a macroscopic open porosity, etc. or arbitrary combinations of these are possible.

The thermoplastic material may be present as a thermoplastic element or by way of a plurality of thermoplastic elements. The element(s) may initially be separate, or it (or at least one of them) may be affixed to the first and/or to the second connector element.

The thermoplastic material may, for example, include a pin element and/or a tube element.

In case the thermoplastic material belongs to more than one thermoplastic element, the different thermoplastic elements may be of a same material, of different thermoplastic materials capable of being welded to each other, or of different thermoplastic materials that cannot be welded to each other. Except in the latter case, a weld between the thermoplastic elements caused by the flowing of material portions into each other while they are flowable may contribute to the locking.

In a group of embodiments, the method includes the additional step of placing an adhesive in a flowable state relative to the first object and the connector elements and of causing the adhesive to harden while it is between the first object and at least one of the connector elements, between the connector elements and/or between the second object (see below; if applicable) and at least one of the connector elements.

The adhesive may be a resin, i.e. a substance that is flowable (generally a viscous liquid) and is capable of hardening permanently by covalent bonds generated between molecules of the resin and/or between molecules of the resin and other substances. For example, such resin may be a composition including a monomer or a plurality of monomers or a prepolymer in a flowable state that is capable of changing irreversibly into a polymer network by curing.

The step of causing the adhesive to harden may include causing such resin to be cured, especially by the effect of the energy (for example mechanical vibration energy) that is coupled into the arrangement to impinge on the thermoplastic material. Absorption of this energy may cause a local heating accelerating a curing process or, depending on the kind of the energy that impinges and on the composition of the adhesive, directly initiate a curing process.

The adhesive may, for example, be dispensed by an injection device on the first/second object and/or on at least one of the connector elements prior to the step of placing the connector elements relative to the opening. In an example, the adhesive may be dispensed on the first and/or second (if applicable) object around a mouth of the opening.

In addition or as an alternative, the adhesive may be provided in the form of an adhesive device, for example a cushion with a membrane capable of being ruptured during the process, the membrane encasing the adhesive. By this approach, it is readily possible to position the adhesive relatively deep in the opening if necessary.

The effect of the adhesive is that it may, after hardening, contribute to the overall mechanical stability of the configuration and/or that it may contribute to sealing effects. It is also possible to use synergistic effects, for example by energy induced or accelerated chemical reactions between the adhesive and the thermoplastic material in their flowable states.

The first and second connector elements are of a material that is not liquefiable. In this text, "not liquefiable" means not liquefiable under the conditions present during the method, i.e., not liquefiable at all or liquefiable only at substantially higher temperatures than the thermoplastic material. Especially, the first connector element, the second connector element or both may be metallic, such as of aluminum or an aluminum alloy or of steel.

Alternatively, the first and/or the second connector element may be of a ceramic, of a not thermoplastic polymer (with or without reinforcement), or of a thermoplastic polymer having a substantially (for example by at least 50°) higher liquefaction temperature than the thermoplastic material (again with or without reinforcement).

In embodiments, in addition or as an alternative to a possible positive-fit connection that locks the connector element with respect to each other, the liquefied and re-solidified thermoplastic material anchors the connecting elements relative to the object in a positive-fit manner. For example, a portion of the thermoplastic material may be caused to flow outward along a mouth of the opening to prevent, after re-solidification, axial movements similar to a rivet. Additionally or alternatively, an inner circumferential surface of the opening may include structures, such as indentations, a porosity, corrugation, a thread etc. that make a positive-fit connection possible. In addition or as yet another alternative, if in addition to the first object also a second object is present, the connector being anchored in aligned openings of the first and second objects, it is possible that the thermoplastic material flows into a gap between the first and second objects.

Additionally or alternatively, a weld may be used to contribute to the anchoring of the connector. In an example between the first object and a second object a thermoplastic foil may be present, the foil being welded to the thermoplastic material.

Both, the first and the second connector elements may include a portion that in the step of placing is caused to reach into the opening, possibly also through the opening.

The opening in the first object may be a through opening, and the connector assembly anchored in the opening reaches through a full length of the opening (corresponding to a full thickness of the object). Especially, the connector assembly may, at least after the thermoplastic material has re-solidified, have portions with a lateral width exceeding the width of the opening on both sides of the object, i.e., a head portion and a foot portion.

In a group of embodiments, the connector is mechanically connected not only to the first object but also to a second object. In this, at least the opening of the first object is a through opening, the second object also includes an opening, and the first and second objects are aligned. In embodiments of this group, especially, a portion of each of the at least one of the connector elements, especially of both of the connector elements, in the step of placing may be placed so that it reaches into or through both openings, thus, a shear plane between the objects is traversed by both, the first connector element and the second connector element.

In embodiments of this group of embodiments, it is possible that also the opening in the second object is a through opening, and the connector assembly anchored in the opening reaches through a full length of the aligned first and second openings (corresponding to a cumulated thickness of the first and second objects and any further element between them). Especially, also in these embodiments, the connector assembly may, at least after the thermoplastic material has re-solidified, have portions with a lateral width exceeding the width of the mouths of the opening on both sides of the object, i.e., a head portion and a foot portion.

In this group of embodiments, the connector may especially serve for mechanically securing the first and second objects to each other. In this, it may have the function of a rivet. In contrast to purely metallic rivets of the prior art, the approach according to the invention however has significant advantages. Due to the approach of "freezing" (causing to re-solidify) flown thermoplastic material, the connector is adapted in its shape to the object(s) in a relaxed state, without any re-setting forces. This is in contrast to for example metallic rivets where in any deformation there is an elastic portion, and as soon as the deforming force stops, the deformed part (rivet part) will tend to a slight movement away from the object (spring back effect) against which it is pressed. In connections of metal rivets to a metal object, this is solved by over-pressing the deformed rivet part into the metal to which it is connected, resulting in a further connection and considerable residual stresses in the rivet and/or the sheet material. However, this is not an option for for example non-metallic objects. Due to the approach according to the here-discussed embodiments of the invention, this problem is solved, and an intimate connection between the object and the connector results independent of the material properties of the object. Any re-setting force by a metallic body of the connector may only act within the connector and does not have any influence on the connection.

Also, the forces to be applied are much smaller than in prior art metallic rivets, because deformation is achieved in a melting phase. This reduces the internal stress and makes a much better process control possible, among other reasons because it is possible to use less stiff tools than in prior art methods.

In embodiments (this pertains to both, embodiments with anchoring in one object and anchoring in two objects), one of the connector elements may include a head portion, and/or the other one may include a foot portion. Then, in the step of placing the first and second connector elements relative to the opening, the one connector element with the head portion is introduced from the proximal side, and the other connector element is introduced from the distal side.

In embodiments where the connector at least after re-solidification includes a head portion and/or a foot portion, the following may apply: The head portion and the foot portion are shaped to keep the connector at its place relative to the first and, if applicable, second objects. Especially, they secure the connector against escaping into axial directions—the foot portion secures the connector against movements into proximal directions by resting against a distally-facing surface of the second object, whereas the head portion secures the connector against movements into distal directions by resting against a proximally facing surface portion of the first object.

For this, the lateral dimensions (dimensions in directions perpendicular to the axis of the opening), of the head portion and//or foot portion may be larger than the corresponding dimension of the mouth of the opening in at least one direction. Especially, the cross sectional area may be larger, or the head portion/foot portion may have a star-like shape.

If the connector is anchored in two objects, due to this arrangement, the connector fulfills the function of a rivet. It can secure the first and second objects together in by one or more of the following mechanisms:

The portion between the head and foot portions traversing the shear plane between the objects secures the objects against shear movements.

The head and foot portions cause the first and second objects to rest against each other.

Depending on the chosen material, the securing together by the head and foot portions may be under some stress so that an interference fit of the first and second objects, causing further resistance against shear movements results.

In embodiments, the first and second openings as well as the shaft portion can have a cross section that is different from circular. Then, the connector also secures against rotational movements.

The opening in the first object (if the connector is anchored only in the first object) or in the second object (if the connector is anchored in the first and a second object) need not be a through opening but can also be a blind opening. Especially, it may be a blind opening with an undercut in which after the process there is a foot portion.

Whereas the connector elements of the embodiments described in this text mostly form a head portion and a foot portion, it would also be possible to have only one of them, for example only a foot portion (especially if primarily pulling forces in proximal directions are to be expected) or only a head portion (especially if primarily loads into distal directions on the connector elements are to be expected).

In embodiments, the second connector element includes an outer tube portion, wherein in the step of placing the second connector element is placed relative to the first connector element so that the outer tube portion encompasses a section of the first connector element. This section of the first connector element may, for example, be a shaft portion or an inner tube portion.

In embodiments, in the step of placing the first and second connector elements, an element including the thermoplastic material, namely a thermoplastic tube element may be placed between the outer tube portion and the encompassed section of the first connector element. Then, in the step of causing energy to impinge, the thermoplastic element is caused to become flowable at least in part until an axial extension thereof is reduced and the thermoplastic material is in intimate contact with at least an inner surface of the outer tube portion and an outer surface of the encompassed section.

In addition or as an alternative, if the encompassed section is an inner tube portion, the inner tube portion may be fenestrated and may be provided with a distal stop face. Then, the step of causing energy to impinge may include pressing a thermoplastic element including the thermoplastic material against the distal stop face while the energy impinges on it until at least a part of the thermoplastic element has become flowable and is pressed through the fenestration in a space between the inner tube portion and the outer tube portion and/or into a fenestration of the outer tube portion. In this, the thermoplastic element may, for example, be a thermoplastic pin.

In addition or as an alternative to the thermoplastic tube element between the outer tube portion and the encompassed section and/or the thermoplastic element pressed into the inner tube portion, the set-up may also include an outer thermoplastic tube element that encompasses the outer tube portion and is placed in a space between the outer tube portion and the circumferential wall of the opening. Also at least parts of this thermoplastic tube element may be caused to become flowable during the process.

In embodiments where the thermoplastic material is provided in the form of more than one element (such as the thermoplastic element to be pressed into the inner tube portion, which element may be tube shaped and/or the thermoplastic tube element between the outer tube portion and the encompassed section of the first connector element and/or the outer tube element), the thermoplastic elements may be of a same material or of different thermoplastic materials capable of being welded to each other. During the step of causing energy to impinge or immediately thereafter, portions of the thermoplastic material coming from different ones of the elements may be caused to flow into each other at meeting places and to cause, after re-solidification, a weld.

Alternatively, the elements may be of thermoplastic materials that cannot be welded.

If different thermoplastic materials are used, they may be chosen for having different properties. For example, in embodiments the "inner" polymer portions (coming from an inner tube element or the thermoplastic element introduced into the inner fenestrated tube portion) may be of a material of considerable strength and having a modulus of elasticity of at least 0.5 GPa so as to provide the locking of the connector elements with sufficient strength. "Outer" polymer portions, especially portions coming from an outer polymer tube element, in contrast may be chosen to have optimized flowing properties, damping properties and/or sealing properties. Especially, in this they may be elastomeric—or vice versa.

In embodiments, the set-up is such that after the step of causing the thermoplastic material to re-solidify the thermoplastic material (and/or, if applicable, in the corresponding embodiments the adhesive) prevents any direct contact between the first connector element and the second connector element and/or the thermoplastic material (and/or, if applicable, in the corresponding embodiments the adhesive) prevents any contact between the first and/or second connector elements and the object or objects.

In embodiments, where the connector is anchored in a first and a second object, for the first and second objects, one or more of the following conditions may hold:
  the first and second objects are of different materials;
  at least one of the first part and of the second object includes a fiber reinforced composite material.

In all categories and groups of embodiments, the openings and the connector elements can be rotationally symmetric about the axis—with the possible exception of the structures for the positive-fit connection and/or the fenestration. Alternatively, the connector and/or the body (if applicable) and/or the openings or one of the openings can have a shape deviating from rotational symmetry. By this, in addition to securing against shear movements and against axial relative movements, the connection may also secure against rotational relative movements.

Generally, in the step of causing the thermoplastic material to be liquefied, liquefaction can be caused to an extent that the liquefied material loses any memory of the shape it had before liquefaction, i.e. to an extent that goes beyond a mere plasticization.

The energy that is caused to impinge on the thermoplastic material may include mechanical energy, such as mechanical vibration energy. Especially, the energy may be mechanical vibration energy coupled directly or indirectly into the element or elements that include the thermoplastic material, from a sonotrode that also couples (directly or indirectly) a pressing force into the thermoplastic material.

In addition or as an alternative, the energy may include radiation energy, such as laser radiation energy absorbed by the thermoplastic material. Further energy sources, such as resistive or inductive heating etc. are not excluded.

If the energy is mechanical vibration energy, the mechanical vibrations may be coupled—in a "forward" configuration—into the connector from a coupling-in face on the proximal side against which a distally-facing face of a sonotrode—coupled to the source of the vibrations—is pushed. The mechanical vibrations thus then are transmitted through and predominantly by the connector itself.

In another, "rearward", configuration, the sonotrode, which is used to apply the vibrations to the thermoplastic material of the connector, is subject to a pulling force. To this end, the sonotrode will include a shaft reaching past or through the thermoplastic connector material, with a distal, proximally-facing coupling out face in contact with a distally-facing distal coupling-in face of the thermoplastic connector material. Such a sonotrode after the step of applying the vibrations may be removed or may alternatively serve as a (not thermoplastic) part of the connector. For example, the first or second connector element may serve as the sonotrode.

In further embodiments, if the opening is a through opening or both, the first and second openings are through openings, respectively, mechanical vibrations are applied from both sides, for example simultaneously.

The invention also concerns a connector device including a first connector element and a second connector element, the first and second connector elements being (initially) movable relative to one another. The second connector element includes an outer tube portion and the first connector element includes an encompassed section, the encompassed section being shaped to be inserted into the outer tube portion so as to be encompassed by the outer tube portion. The device further includes a thermoplastic material capable of being placed relative to the first and second connector elements and of being liquefied, by the impact of energy, until a flow portion becomes flowable and flows relative to the first and second connector elements until it is in direct contact with both, the first connector element and the second connector element (in many embodiments in particular with both, the outer tube portion and the encompassed section) to lock, after re-solidification, the outer tube portion and the encompassed section with respect to one another by way of a positive-fit connection. To this end, the outer tube portion and the encompassed section may include corresponding structures, such as a fenestration, and/or a pattern of indentations and/or protrusions.

The corresponding structures of the outer tube portion and the encompassed section may face each other at least in parts, i.e. for example the indentations/protrusions may include indentations/protrusions of an inner wall surface of the outer tube section and of an outer surface of the encompassed section In case of a fenestration, the structure by definition faces the respective other portion; and optionally, if both, the outer tube portion and the encompassed section are fenestrated, the corresponding holes may optionally be aligned with each other.

The thermoplastic material may be present as a thermoplastic element or a plurality of thermoplastic elements.

In embodiments, the device may include any combination of the features described in this text referring to the method.

In embodiments in which the method is carried out in an automated manner, the vibrations may for example by applied by vibration generating tools guided by robot arms. In addition or as an alternative, tools that apply the vibrations on the two sides may be arranged in a clamp-like arrangement.

Also, the apparatus may include means for automatically placing the connector in the aligned openings. For example, a robot arm or other tool that holds the source of the vibrations may be provided with an automatic feed for the connector. For example, the feed may include a magazine for connectors and a separating and feeder unit for feeding the connectors one after the other to the arranging place.

Accordingly, the invention also concerns an apparatus having the means and being configured to carry out the method as defined in the claims in an automated manner.

Mechanical vibration or oscillation suitable for methods and devices according to aspects of the invention has preferably a frequency between 2 and 200 kHz (even more preferably between 10 and 100 kHz, for liquefaction at the distal end or as far as the distal end between 15-30 kHz, for liquefaction at the proximal end (head forming) only between 15-70 kHz) and a vibration energy of 0.2 to 20 W per square millimeter of active surface. Such vibrations are e.g. produced by ultrasonic devices as e.g. known from ultrasonic welding. The vibrating element (tool, for example sonotrode) is, e.g., designed such that its contact face oscillates predominantly in the direction of the element axis (longitudinal vibration) and with an amplitude of between 1 and 100 µm, preferably around 10 to 30 µm. Rotational or radial oscillation is possible also.

The fact that the thermoplastic material is liquefied by mechanical vibration brings about the advantage that the process is potentially very fast. Tests have revealed that under the above-described conditions as short time as about 1 s or even as short as 0.5 s may be sufficient.

The onset of liquefaction may further be controlled by geometrical structures in the form of energy directors as known from ultrasonic welding. Energy directors (or energy concentrating structures) may have the shape of ribs or humps or similar, either of the thermoplastic material or of the surface that comes into contact with the thermoplastic material. Generally, energy directors will be shaped to yield a comparably small interface area at the interface at which liquefaction is to set in to concentrate the vibration energy to this small area so that there will be a higher energy absorption per unit area that will cause a stronger heating. As soon as the temperature at these places is above the glass transition temperature, there will be enhanced internal friction, and this will further promote the energy absorption and liquefaction.

A further parameter that may be optionally used to control the spot where liquefaction sets in is its initial temperature. Due to the fact that internal friction only becomes high when the local temperature is above the glass transition temperature, the efficiency of the liquefaction step (much like in prior art ultrasonic welding) goes up only when this temperature is achieved at some spot. Before this, the efficiency of the energy absorption—needed to bring the material locally above the glass transition temperature—is relatively lower. This fact may be used to exert a further control. More in particular, the method may optionally include the step of:
bringing a portion of the thermoplastic material above the glass transition temperature by local direct or indirect heating while other portions of the thermoplastic material remain below the glass transition temperature.

In this, direct heating may, for example, be achieved by directed irradiation, such as irradiation by a laser (e.g. infrared or red) at the desired place, immediately before the step of arranging or thereafter (if the geometrical configuration allows so).

Indirect heating may, for example, be achieved by heating of the region of the object with which the connector comes into contact, such as by local heating of the second object around the opening.

The step of heating is carried out at least before or during the step of applying. This implies that, for example, the heating step may also start before the step of applying and be continued for some time while the vibrations are applied.

In this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally or rotationally moved relative to each other, wherein the frequency of the vibration has the properties discussed hereinbefore. In some situations, it is advantageous if the material has an elasticity coefficient of more than 0.5 GPa, especially if no non-liquefiable body is used.

For the thermoplastic material of the connector, especially at least one of the following three conditions may be met:
  The glass transition temperature is above room temperature so that at room temperature the thermoplastic material is below the glass transition temperature. More in general, the glass transition temperature may be chosen to be above a temperature of intended usage.
  The thermoplastic material is highly crystalline.
  The thermoplastic material is itself fiber reinforced.
  Any combination of these is possible.

Thermoplastic materials are well-known in the automotive and aviation industry. For the purpose of the method according to the present invention, especially thermoplastic materials known for applications in these industries may be used.

Specific embodiments of materials are: Polyetherketone (PEEK), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for the non-flowing portion.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

In this text, the terms "proximal" and "distal" are used to refer to directions and locations, namely "proximal" is the side of the connection from which an operator or machine applies the mechanical vibrations, whereas distal is the opposite side. A broadening of the connector on the proximal side in this text is called "head portion", whereas a broadening at the distal side is the "foot portion".

BRIEF DESCRIPTION OF THE DRAWINGS

In the following, ways to carry out the invention and embodiments are described referring to drawings. The drawings are schematic in nature. In the drawings, same reference numerals refer to same or analogous elements. The drawings show.

DETAILED DESCRIPTION OF THE INVENTION

Figure 1A:
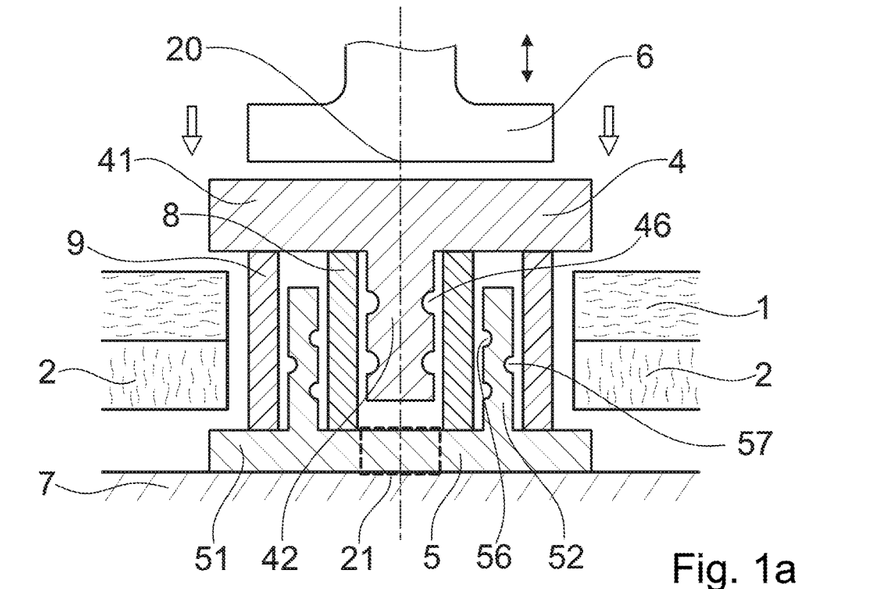
FIGS. 1a and 1b, in vertical section, a basic configuration of embodiments of the invention at the beginning and at the end of the process, respectively.

FIG. 1a depicts a basic set-up of embodiments of the invention. In the depicted embodiment, in addition to a first object 1, the connector is also to be connected to a second object 2 and to thereby connect the first and second objects 1, 2 to each other in a rivet-like manner.

The first and the second objects 1, 2 each have a through opening, the through openings being aligned with each other.

The first object 1 and the second object 2 may each, for example, be boards or sheets, for example of a metal or of a fiber reinforced composite or of foam filed carbon fiber reinforced sandwich element material. The second object may be of the same material composition as the first object or of a different material than the first object.

The first connector element 4 is of a metal, such as aluminum or an aluminum alloy or of steel. It is one-piece and has a proximal head portion 41 and a shaft portion 42.

The second connector element 5 is also of a metal, for example the same material as the first connector element. Also the second connector element is of one piece. The second connector element has a distal foot portion 51 and a tube portion 52 protruding from the distal foot portion into a proximal direction.

The assembly further includes a first thermoplastic element 8 and a second thermoplastic element 9. Both, the first thermoplastic element 8 and the second thermoplastic element 9 are each tube-shaped. The first thermoplastic element 8 has an inner diameter larger than an outer diameter of the first connector element's shaft portion 42 and surrounds, in the pre-assembled condition depicted in FIG. 1a, the shaft portion at least partially. An outer diameter of the first thermoplastic element 8 is smaller than an inner diameter of the tube portion 52, and in the pre-assembled condition the first thermoplastic element is at least partially surrounded by the tube portion 52.

The second thermoplastic element 9 has a smaller outer diameter than the through openings of the objects 1, 2. Its inner diameter is smaller larger than the outer diameter of the tube portion 52, and it surrounds the tube portion 52.

In FIG. 1*a*, the spaces between the tube-shaped thermoplastic elements, the first connector, the second connector, and the openings are, for illustration purposes, shown somewhat exaggerated. In practice, such spaces may be small, compared to the thickness dimensions of the thermoplastic elements, and it is also possible that the shaft portion's, the thermoplastic elements' and the tube portion's dimensions are adapted to each other so that they slidingly fit into each other.

Figure 2:
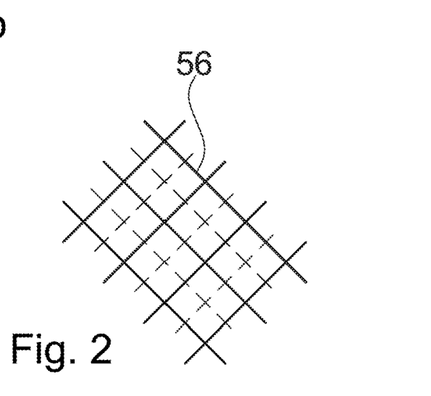
FIG. 2 a pattern of indentations.

The outer surface of the shaft portion 42 as well as the inner surface of the tube portion 52 are not smooth but are provided with a macroscopic structure. In particular, the circumferential outer surface of the shaft portion is provided with shaft portion indentations 46, and the inner surface of the tube portion is provided with inner tube portion indentations 56. The respective indentations 46, 56 may include circumferential grooves, grooves running in inclined directions, patterns of grooves, such as a pattern illustrated in FIG. 2, dips, a macroscopic open porosity, etc. or arbitrary combinations of these. One possible condition for the indentations is that when filled by re-solidified thermoplastic material they prevent axial relative movements of the first and second connector elements in a positive-fit like manner. In other words, the indentations form undercuts with respect to axial directions.

In addition to the inner surface, in the depicted embodiment also the outer surface of the tube portion is provided with indentations, namely outer tube portion indentations 57. Also these may be such as to form undercuts with respect to axial directions.

The elements shown in FIG. 1*a*, i.e. the connector elements 4, 5 as well as the thermoplastic elements 8, 9 and the through openings in the objects 1, 2 may be essentially symmetric with respect to rotation around axial directions (axis 20).

This, however, is not a requirement. Rather, the overall shapes may be chosen depending on the requirements. For example, if the anchoring of the connectors relative to the objects and/or the connection of the objects relative to each other is to resist torsional relative moments, then the overall shapes may depart from circular symmetry. Any shape, including rectangular, triangular, pentagonal, hexagonal etc., in each case possibly with rounded edges, lobed, star-shaped, elliptical, etc. is possible for the named elements.

Figure 14:
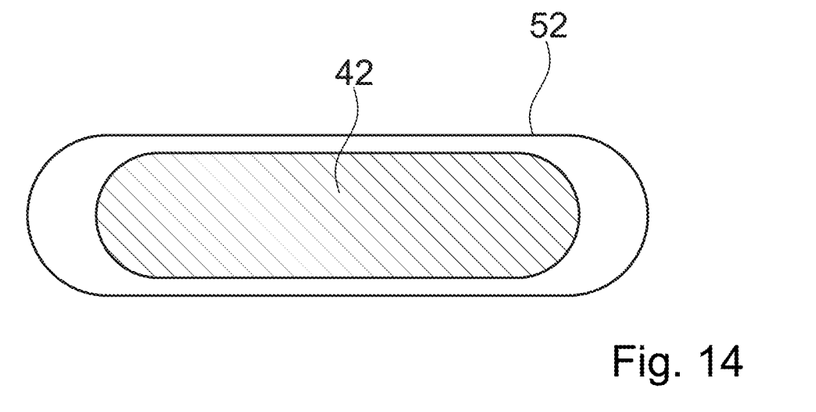
FIGS. 14 and 15 schemes of cross sections adapted to non-circular openings.
Figure 15:
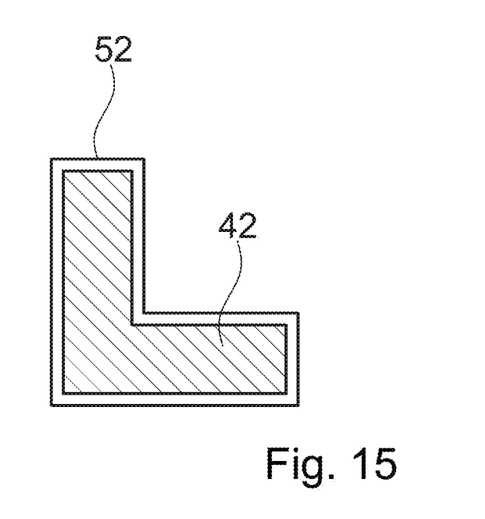

This pertains to all embodiments described in this text: while circular symmetry is an option, it is not a requirement. FIG. 14 very schematically depicts a cross sectional geometry (for the example of the embodiment of FIG. 1*a*) of an inner portion (here shaft portion 42) and an outer portion (here the tube portion 52), which geometry is adapted for an opening having the shape of a slot hole. It is even possible that the connector is adapted for an angled opening, for example as used to secure a corner connection as schematically sketched in FIG. 15.

Also, the indentations described hereinbefore may be arranged in a manner deviating from a circular symmetry even if the elements themselves are essentially circularly symmetric with respect to rotations about the axis 20.

A sonotrode 6 is used to press the first connector element 4 towards a distal side while a non-vibrating support 7 supports the second connector element 5. At the same time mechanical vibrations are coupled from the sonotrode into the first connector element of which a proximal (upper in FIG. 1*a*) end face serves as a coupling-in face for the mechanical vibrations. Consequently, vibrations are coupled from the first connector element into the thermoplastic elements. By the joint effect of the pressing force and the mechanical vibrations, at least a portion of the thermoplastic material starts liquefying and flows into open spaces around them.

Figure 1B:
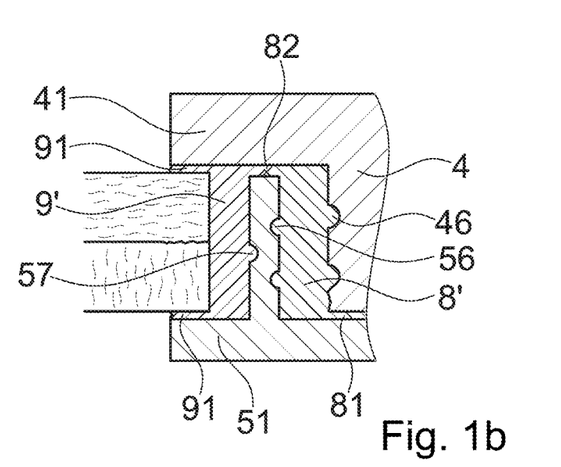

FIG. 1*b* shows the assembly resulting after the flowing of the thermoplastic material and the re-solidification in a partial sectional view. The thermoplastic material fills the indentations 46, 56, 57 and thereby locks the connector elements 4, 5 to each other with respect to relative axial movements. Also, by filling the outer tube portion indentations 57, it may contribute to the anchoring of the assembly in the openings. In the depicted configuration, the dimensions are chosen so that the thermoplastic material forms a complete isolation between the first and second connector elements as well as between the connector elements and the objects 1, 2. Especially, the thermoplastic material forms a layer 91 between surface portions of the connector elements' head portion 41 and foot portion 51, respectively, and the object surface portions around the mouth of the opening. Also, it forms a layer 81 between the distal end face of the shaft portion 42 and the foot portion 51 as well as a layer 82 between the distal end of the tube portion 82 and the head portion 41.

The materials of the first and second thermoplastic elements 8, 9 may be the same. Then, at the places where their respective flow portions flow into each other, a weld may be formed. This also may be the case if the thermoplastic material of the thermoplastic elements is not the same but are capable of being welded together. Alternatively to a forming weld, the thermoplastic materials may also meet at an interface, which interface does not need to be defined precisely.

In the depicted configuration, the connector connects the first and second objects to each other in a rivet-like manner without the disadvantages of a conventional metal rivet connector. Especially, due to the fact that the thermoplastic material isolates the connector elements from the objects, no corrosion problems are expected to arise.

In addition or as an alternative to securing the first and second objects to each other, the connector may also serve for connecting further parts to the objects. To this end, the first and/or second connector element may include corresponding coupling structures (not shown in FIGS. 1*a*/1*b*) for coupling to a further part.

Especially in case a connection to such a further part may be expected to be subject to substantial pulling forces, the connector may be provided with means for absorbing such pulling forces without loading the coupling between the connector elements. For example, in a configuration like the one of FIGS. 1*a* and 1*b*, if the second connector element is provided with an central opening through the foot portion (at the place illustrated by the dashed box 21) and second connector element is provided with a coupling structure, pulling forces acting from the distal direction (i.e. from below in the depicted orientation) may be directly coupled into the first connector element and be absorbed by the fact that the head portion 41 rests against the proximal surface of the first object, with the—damping—thermoplastic layer 91 therebetween. To this end, the shaft portion may optionally be shaped to be longer than in the depicted configuration and even to protrude on the distal side. A suitable means (such as a plastic shell that does not liquefy during the process) may be used to prevent liquefiable material from exiting through the central opening.

A suitable coupling structure may, for example, be a thread, or a bayonet fitting structure.

Figure 3:
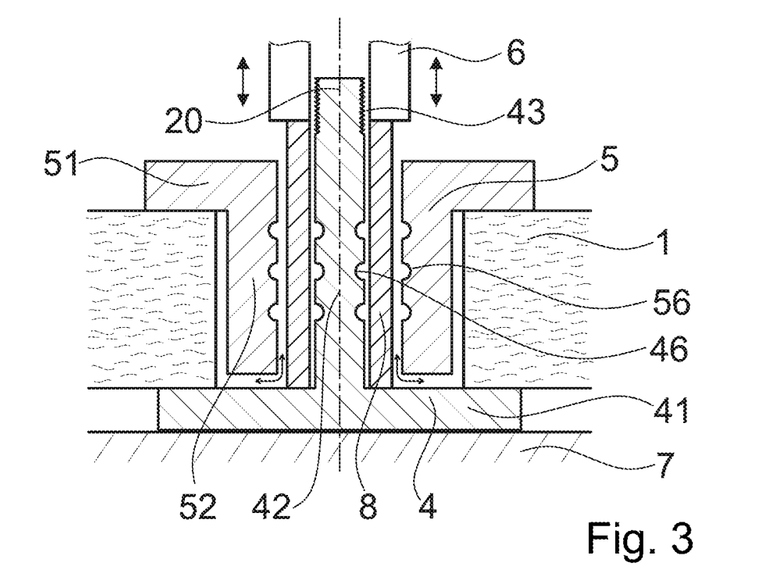
FIG. 3, in vertical section, an alternative configuration.

An alternative set-up is shown in FIG. 3. The configuration of FIG. 3 is distinct from the configuration illustrated in FIGS. 1a and 1b by the following features:

The connector is connected to a single object 1 with a through opening instead of to two objects.

The connector assembly does not include an outer thermoplastic element. Rather, the connector elements 4, 5 are allowed to come into direct contact with the object 1.

The first (inner) connector element 4 includes a (distal) foot portion 41 in addition to the shaft portion 42, and the second (outer) connector element 5 includes a head portion 51 in addition to the shaft portion 52.

The shaft portion 42 of the first connector element 4 protrudes above the object's proximal surface on the proximal side. The depicted embodiment, it is illustrated to include a thread 43.

The sonotrode 6 is a ring sonotrode to apply the mechanical vibrations directly to the thermoplastic element 8.

The use of the ring sonotrode makes possible that the vibrations are applied independent on the axial extension of the first connector's shaft 42. Apart from this, these named features are independent from each other, and alternative embodiments may include only some of them, in any combination. For example, any configuration described or discussed herein may be used for connecting the shown connector to a single object 1 or to two objects 1, 2 with aligned openings. Also, the configuration of FIG. 3 may include a second, outer thermoplastic element (to this end, for example towards the end of the process the ring sonotrode may couple the vibrations directly into the second connector element, with the second thermoplastic element being compressed between the head portion 51 and the foot portion 41. Etc.

Figure 6:
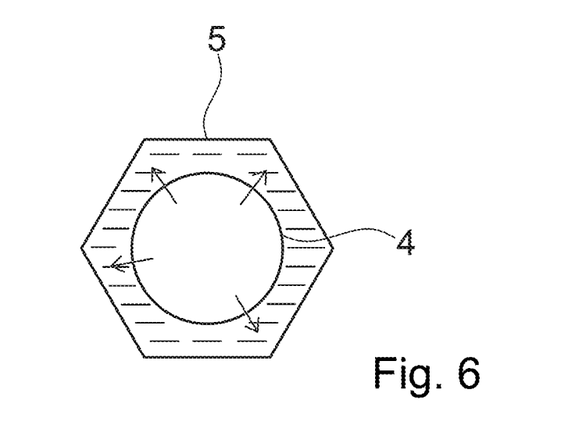
FIG. 6 a scheme of different cross sectional shapes of an inner section of a first connector element and an outer section of a second connector element.

Instead of using a ring sonotrode, in a set-up as shown in FIG. 6 it would also be possible to couple the first connector element 4 to a vibration source and use the first connector element as a sonotrode that is subject to a tensile (pulling) force while vibrations are coupled into the thermoplastic element from the distal (rearward) side. A counter element may be used to apply the necessary counter force on the thermoplastic element from the proximal side.

Figure 4:
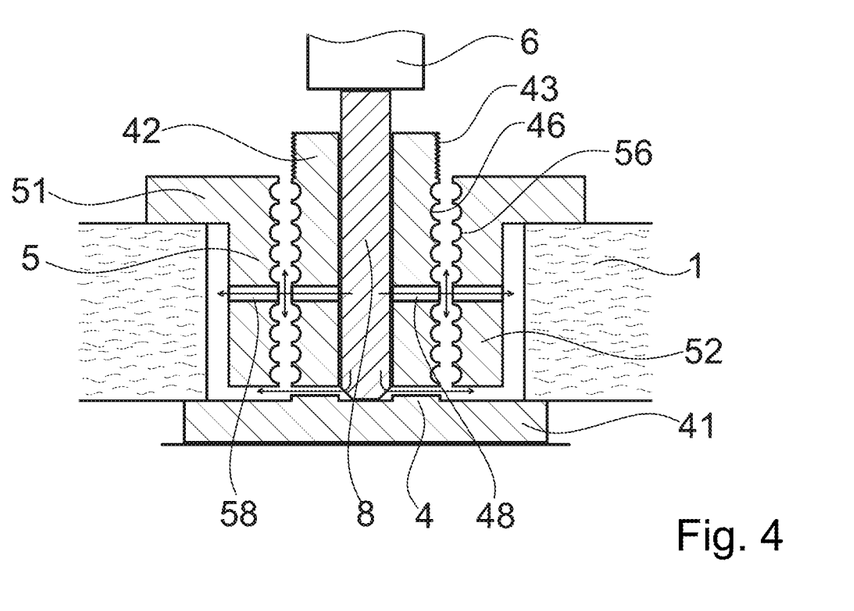
FIG. 4, in vertical section, a further configuration.

The embodiment of FIG. 4 is a first example of an 'inside-out' set-up where a tube portion of at least one of the connector elements includes a fenestration, i.e., a plurality of holes through which flowable thermoplastic material flows out and after re-solidification locks the tube portion to the other connector element and/or to the object. In these embodiments, the thermoplastic material is inserted into the tube portion's respective interior space and pressed against a distal face while mechanical vibrations are coupled directly or possibly indirectly into it from a sonotrode 6. This has the effect of liquefying at least portions of the thermoplastic material and pressing it through the holes 48, 58. In these embodiments, the (first) thermoplastic element 8 may optionally be pin-shaped as illustrated in FIG. 4.

In FIG. 4, both, the first connector element and the second connector element each include a tube portion 42, 52. The second connector element's (outer) tube portion 52 encompasses the first connector element's (inner) tube portion 42, and each tube portion is fenestrated, i.e. perforated by a plurality of the holes 48, 58. The thermoplastic material, as indicated by the arrows, flows into the holes 48, 58 as well as into the spaces between the tube portions 42, 52 and between the outer tube portion 52 (second connector element's tube portion) and the object 1.

The locking of the first and second connector elements with respect to each other as well as the connection to the object is caused by the re-solidified thermoplastic material in the holes 48, 58, as well as optionally by the same mechanisms as discussed for the hereinbefore described embodiments. For the latter purpose, the connector elements include respective structures such as indentations 46, 56.

Figure 5:
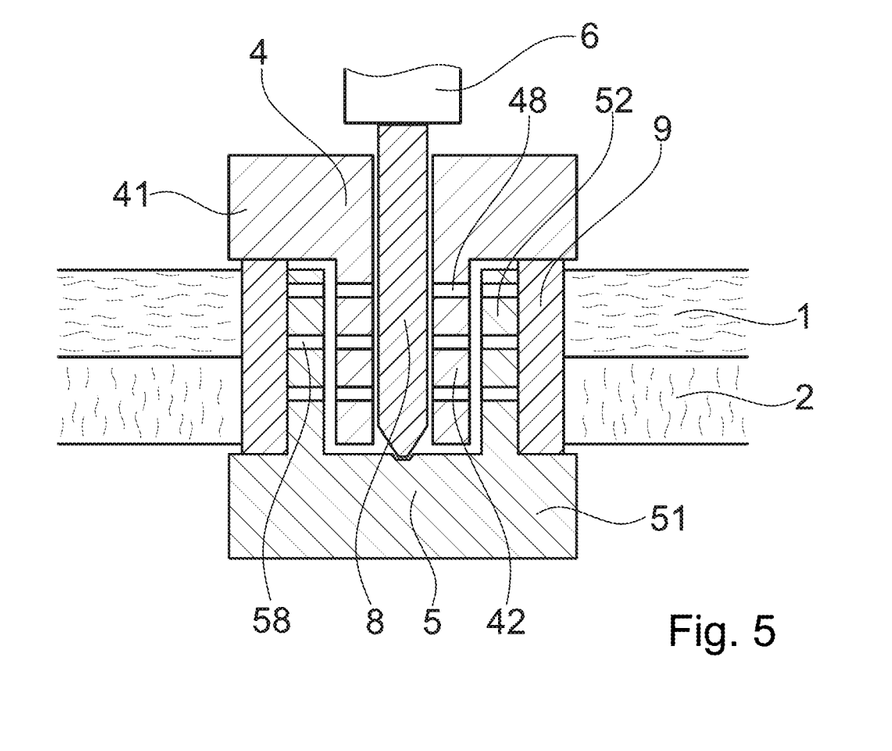
FIG. 5, in vertical section, yet another configuration.

The embodiment of FIG. 5 is another example of an 'inside-out' set-up in which a tube portion of at least one of the connector elements includes a fenestration through which flowable thermoplastic material flows out during the process to lock the tube portion after re-solidification.

In contrast to the embodiment of FIG. 4, the first connector element includes a head portion 41.

Further, the set-up also includes a second, outer thermoplastic element 9 being a tube element between the second (outer) connector's tube portion 52 and the inner walls of the openings in the objects 1, 2. Optionally the second thermoplastic element may have an axial dimension that initially is larger than a cumulated thickness of the objects 1, 2 around the opening. Then, the process of coupling mechanical vibration energy into the assembly may include pressing the first thermoplastic element 8 towards a distal direction and thereby causing liquefied portions to flow into outward directions until its distal end face is flush with the distal end face of the first connector element, and may include continuing the pressing of the vibrating sonotrode 6 against a distal direction to couple the vibration into the first connector element until also material of the second thermoplastic element becomes flowable. Similar to the embodiments described referring to FIGS. 1a and 1b, the process may optionally result in a weld of the material from the thermoplastic elements 8, 9.

These two features are independent of each other and can be implemented individually or in combination.

Similar to the embodiment of FIGS. 1a and 1b, the assembly may be configured so that there is no direct contact between the connector elements and the objects.

The sonotrodes 6 used in embodiments of the method have a distal end face adapted to the shape or desired shape of the connector's proximal end face. Optionally, it may have a guiding feature, such as a guiding protrusion cooperating with a corresponding feature, such as an indentation, of the connector to guide the sonotrode during the process.

FIG. 6 yet very schematically shows a scheme of different cross sectional shapes of an inner section of a first connector element 4 and an outer section of a second connector element 5 (cross section perpendicular to the axis). The configuration is assumed to be of an inside-out type with the first connector element having an inner tube portion through a fenestration of which the thermoplastic material in a flowable state is pressed out (illustrated by the arrows). The space between the inner and outer tube portions (shown dashed) is thereby filled by the polymer.

The inner tube portion in this is assumed to be circular in cross section, whereas the outer tube portion is polygonal (hexagonal). The polymer material in addition to providing the mechanical locking and/or other desired properties (insulation/damping etc.), also ensures that the different shapes are compensated for.

Also, together with the fenestration (with the corresponding holes being filled by liquefied re-solidified thermoplastic material), the non-circular shape of the outer tube element together with a suitably adapted cross sectional shape of the opening(s) may contribute to a locking of the connector or connection of two objects with respect to torsional loads.

Figure 7:
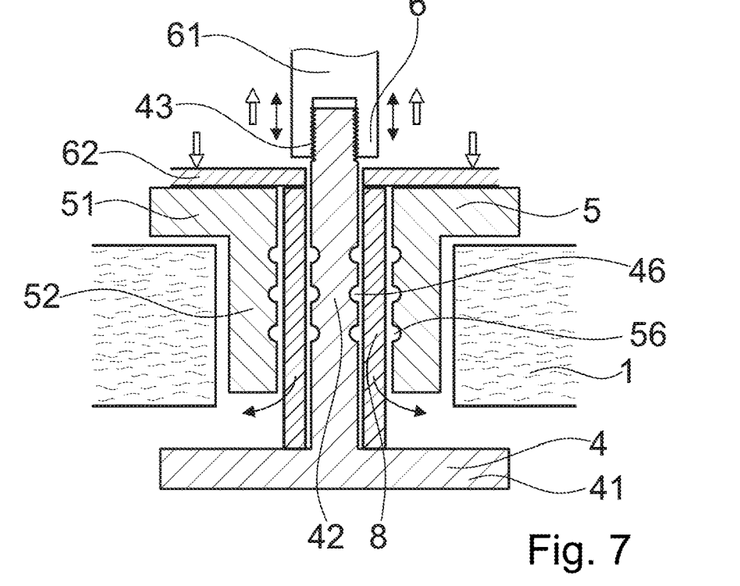
FIG. 7 an even further configuration, again in vertical section.

The embodiment shown in FIG. 7 is an example of a "rearward" configuration. The first connector element 4 is coupled to a vibration generating apparatus 61 (of which in the figure only the coupling arrangement coupled to the thread 43 of the first connector element 4 is depicted) and serves as the sonotrode into which, during the process of coupling mechanical vibration energy into it, a tensile force is coupled. A counter element 62 is used to couple a counter force into the thermoplastic element 8.

Due to the joint effect of the mechanical vibration coupled into the first connector element and the pulling force, a flow portion of the thermoplastic material of the thermoplastic element 8 becomes flowable, for example starting at the distal (lower) end of the thermoplastic element.

In the depicted configuration, the first connector element 4 that serves as the sonotrode is, during the liquefaction process, pulled to move towards the proximal side, whereas the counter element is held against the upper surface of the second connector element 5. However, it would also be possible to hold the sonotrode still and to move the counter element during the process, or to perform combined movements. The counter element instead of being essentially plate-shaped as depicted may have other shapes, including the possibility of being tube shaped to reach into the outer tube portion 52 during the process.

Apart from being a "rearward" arrangement, the arrangement shown in FIG. 7 is similar to the one of FIG. 3. The principle of coupling the energy from the distal (rearward) side into the thermoplastic material, however, is also an option for other embodiments, both, for anchoring in just one object or for connecting two objects. For example, also the embodiment of FIG. 4 may readily be adapted to a rearward configuration, with the first connector element 4 serving as the sonotrode, and with the sonotrode 6 replaced by a counter element.

With reference to the embodiments of FIGS. 8-13, a couple of further optional features and concepts are discussed. The configurations drawn in FIGS. 8-13 are based on the configuration of FIGS. 1a and 1b, and the description of these figures is referred to for explaining the elements that are not explicitly mentioned again hereinbelow. However, the features and concepts are not only applicable for the embodiment of FIGS. 1a and 1b but are optional possibly advantageous figures for all kinds of embodiments, including embodiments that are based on anchoring in one object only, forward and rearward configurations, "inside-out" configurations (FIGS. 4-6) and any other configuration that is within the scope of the present invention.

Figure 8:
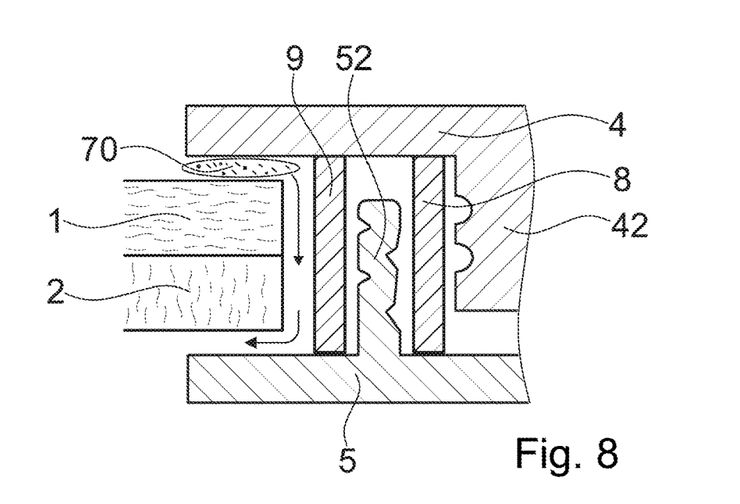
FIG. 8 a partial vertical section of an example of a configuration with an adhesive.
Figure 9:
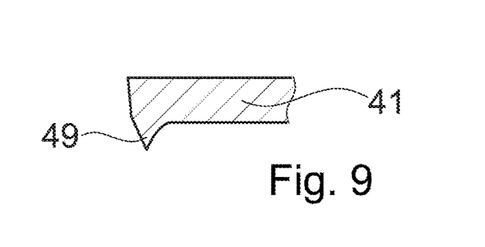
FIGS. 9 and 10 details the connector elements having flow confiners.
Figure 10:
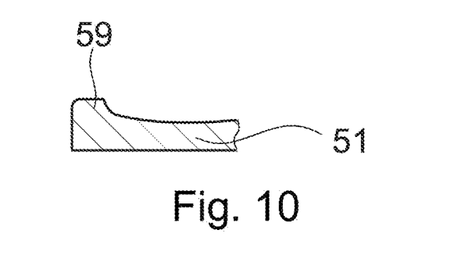

As shown in FIG. 8, in addition to the thermoplastic material an adhesive 70 may also be provided. The adhesive 70 may be placed, in a flowable state, to be properly distributed upon when the connector elements in the process are moved relative to one another (see a possible flow path illustrated by arrows in FIG. 8). Possible confinement portions 49, 59 (see FIGS. 9 and 10) and/or flow channels (not shown) of the first and/or second connector elements in this may direct the flow of the adhesive. If the adhesive is a curable resin, the absorption of the mechanical vibration and the heating effect generated thereby may assist the hardening process.

Such an adhesive may have one or more of the following purposes:

By adhering to the first connector element, the second connector element, the first object and/or (if applicable) the second object, it may contribute, after hardening, to the overall mechanical stability of the assembled configuration.

The adhesive may optionally have a comparably low viscosity and thereby flow well relative to the elements/objects, whereby it may contribute to sealing effects or even be the predominant sealing material.

The adhesive may chemically react with the thermoplastic material to change its properties.

Figure 11:
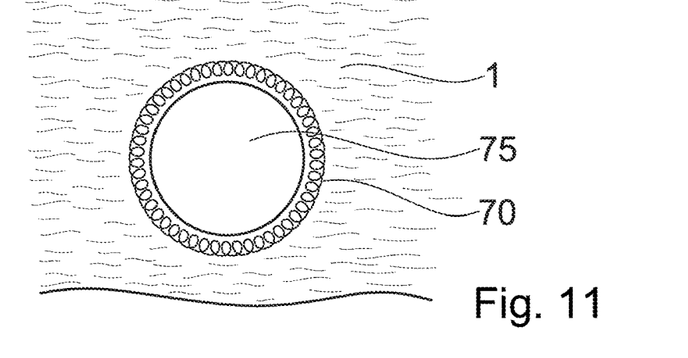
FIG. 11 a view from the proximal side of a first object with an adhesive dispensed around a mouth of the opening.

The adhesive 70 may, according to an option, be dispensed around the mouth of the opening 75 in the first object 1 (and/or, of applicable, the second object), as shown in FIG. 8 and FIG. 11.

Alternatively, it would be possible to provide the adhesive material in a cushion in which it is surrounded by a membrane 71 that during the process, by the effect of the forces and of the vibrations, is ruptured. Cushions of this kind may be easily manufactured, and depending on the resin composition used, they can be stored in a manner that the resin does not substantially cross-link until released from the cushion during the process—for example by being stored at a suitable temperature, by having a composition that requires an initiator for the cross-linking to take place (which initiator is not in the cushion, for example oxygen, or is in a separate chamber within the cushion), by providing a two-component resin in two separate chambers in the cushion, etc.

Such a cushion—or a plurality of cushions—features/feature the potential advantage that the material may be placed at any desired location, including relatively deep underneath the surface, and may have a desired initial distribution.

Figure 12:
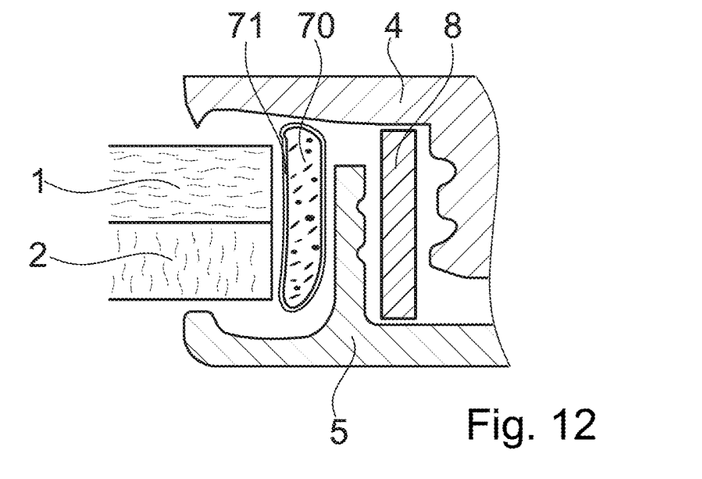
FIGS. 12 and 13 partial vertical sections of further examples of a configuration with an adhesive.

FIG. 12 illustrates a first example, in which the resin 70 cushion, compared to the embodiment of FIG. 1a, replaces the second thermoplastic element and thereby ensures locking and, if desired, depending on the geometry, isolation between the connector elements and the first/second object, at least in a certain depth within the opening.

Figure 13:
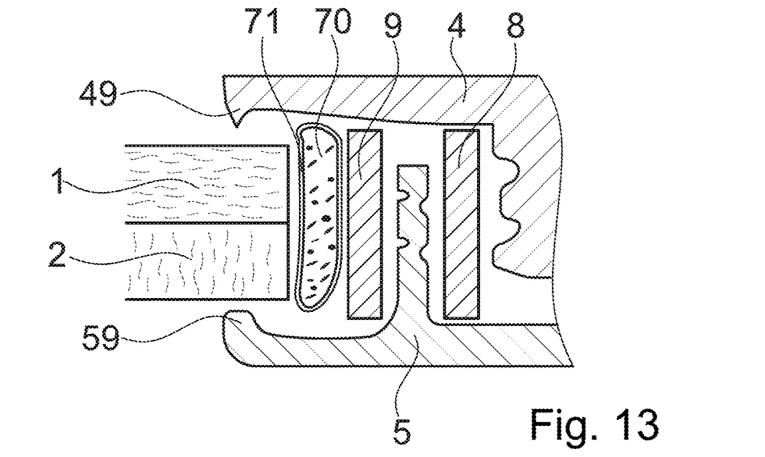

FIG. 13 shows a second example, where a resin cushion is placed in a gap between the second thermoplastic element 9 and the circumferential wall of the opening.

What is claimed is:

1. A method of mechanically connecting a connector to a first object, comprising the steps of:

providing the first object, the first object having an opening;

providing a first connector part, a second connector part, and thermoplastic material in a solid state;

placing the first and second connector parts relative to the opening;

causing energy to impinge on the thermoplastic material, until at least a flow portion thereof becomes flowable and flows relative to the first and second connector parts until it is in direct contact with both, the first connector part and the second connector part;

causing the thermoplastic material to re-solidify;

whereby the re-solidified thermoplastic material locks the first and second connector parts relative to one another to yield a connector assembly comprising the first connector part, the second connector part and the thermoplastic material; and whereby the connector assembly is anchored in the opening by the thermoplastic material or by the locking of the first and second connector parts or both;

wherein one of the connector parts comprises a head portion, wherein the other one of the connector parts comprises a foot portion, and in the step of placing the first and second connector parts relative to the opening, the one connector part with the head portion is placed into the opening from a proximal side of the opening so that a portion of the one connector part reaches into the opening and the head portion remains proximally thereof, and the other one of the connector parts is placed into the opening from a distal side of the opening so that a portion of the other one of the connector parts reaches into the opening and the foot portion remains distally therefrom.

2. The method according to claim 1, wherein the step of causing energy to impinge comprises causing the flow portion to flow into structures of the first connector part and of the second connector part, whereby the re-solidified thermoplastic material locks the first and second connector parts relative to one another in a positive-fit manner.

3. The method according to claim 2, wherein the structures comprise at least one groove or ridge, a pattern of dips or humps, a macroscopic open porosity, or a combination of these.

4. The method according to claim 1, wherein in the step of causing energy to impinge neither material of the first nor of the second connector part is liquefied.

5. The method according to claim 4, wherein the first connector part and the second connector part are both metallic.

6. The method according to claim 1, wherein the opening in the first object is a through opening, and the connector assembly anchored in the opening reaches through a full length of the opening.

7. The method according to claim 1, wherein in addition to being mechanically connected to the first object, the connector is also mechanically connected to a second object.

8. The method according to claim 1, wherein the second connector part comprises an outer tube portion, wherein in the step of placing the second connector part is placed relative to the first connector part so that the outer tube portion encompasses a section of the first connector part.

9. The method according to claim 8, wherein the flow portion includes material that flows until it is in an intimate contact both, with an inner surface of the outer tube portion and with an outer surface of the encompassed section.

10. The method according to claim 8, wherein the first connector part comprises a shaft portion, and after the step of placing the first and second connector parts the shaft portion is at least partially encompassed by the outer tube portion and thus constitutes the encompassed section.

11. The method according to claim 8, wherein the step of placing the first and second connector parts comprises placing a thermoplastic tube between the outer tube portion and the encompassed section, and wherein in the step of causing energy to impinge, the thermoplastic tube is caused to become flowable at least in part until an axial extension thereof is reduced and the thermoplastic material is in intimate contact with at least an inner surface of the outer tube portion and an outer surface of the encompassed section.

12. The method according to claim 8, wherein the step of placing the first and second connector parts comprises placing an outer thermoplastic tube encompassing the outer tube, and wherein in the step of causing energy to impinge, the outer thermoplastic tube is caused to become flowable at least in part until an axial extension thereof is reduced and the thermoplastic material is in intimate contact with at least an outer surface of the outer tube portion and an inner surface of the opening.

13. The method according to claim 1, wherein the first connector part comprises an inner tube portion, which inner tube portion is fenestrated.

14. The method according to claim 13, wherein the inner tube portion comprises a distal stop face and wherein the step of causing energy to impinge comprises pressing a thermoplastic element with the thermoplastic material against the distal stop face while the energy impinges on it until at least a part of the thermoplastic element has become flowable and is pressed outward through the fenestration.

15. The method according to claim 13, wherein the second connector part comprises an outer tube portion at least partially encompassing the inner tube portion.

16. The method according to claim 15, wherein the outer tube portion is fenestrated.

17. The method according to claim 1, wherein the energy is mechanical vibration energy.

18. The method according to claim 17, wherein in the step of causing the energy to impinge a sonotrode is used to simultaneously apply a pressing force and couple the vibrations directly or indirectly into the thermoplastic element.

19. The method according to claim 17, wherein in the step of causing the energy to impinge, the vibrations are applied to a proximal side and to a distal side simultaneously at least for some time.

20. The method according to claim 1, and comprising the additional step of placing an adhesive in a flowable state relative to the first object and the connector parts and of causing the adhesive to harden.

21. The method according to claim 20, wherein the adhesive is caused to harden while it is:
between the first object and at least one of the connector parts,
between the connector parts
and/or between a second object and at least one of the connector parts.

22. The method according to claim 20, wherein the adhesive is a curable resin.

23. The method according to claim 20, wherein the step of causing the adhesive to harden comprises causing the adhesive to harden by the effect of the energy impinging on the thermoplastic material.

24. The method according to any claim 20, wherein the step of placing comprises dispensing the adhesive by an injection device prior to the step of placing the connector parts relative to the opening.

25. The method according to claim 20, wherein the step of placing comprises providing a cushion containing the adhesive and placing the cushion relative to the first object and the connector parts.

* * * * *